United States Patent [19]

Tanaka

[11] Patent Number: 4,694,340
[45] Date of Patent: Sep. 15, 1987

[54] VERTICAL SYNCHRONIZING SIGNAL SEPARATING CIRCUIT

[75] Inventor: Hidenori Tanaka, Yokohama, Japan

[73] Assignee: Victor Company of Japan, Ltd., Yokohama, Japan

[21] Appl. No.: 864,783

[22] Filed: May 19, 1986

[30] Foreign Application Priority Data

May 20, 1985 [JP] Japan ............................. 60-74494[U]

[51] Int. Cl.[4] .............................................. H04N 5/10
[52] U.S. Cl. .................................... 358/154; 358/153; 328/139
[58] Field of Search ....................... 358/148, 153, 154; 328/109, 110, 139

[56] References Cited

FOREIGN PATENT DOCUMENTS 53-41925  4/1978  Japan .
54-39519  3/1979  Japan .
56-120269 9/1981  Japan .
2039440   8/1980  United Kingdom ................ 358/154

OTHER PUBLICATIONS

"A Digital Separator for TV Field Synchronizing Pulses"; by A. Racciu; Alta Frequenza (Italy); vol. XXXIX, No. 8, Aug. 1970, pp. 741-742.

Primary Examiner—James J. Groody
Assistant Examiner—Michael D. Parker
Attorney, Agent, or Firm—Michael N. Meller

[57] ABSTRACT

A vertical synchronizing signal separating circuit comprises a series circuit including a pair of flip-flops coupled in series for generating a first pulse signal which is in phase synchronism with leading edges of a composite synchronizing signal and has a pulse width corresponding to one period of clock pulses supplied thereto, a first latch circuit for latching the composite synchronizing signal by trailing edges of the first pulse signal so as to produce a second pulse signal having a predetermined level when the composite synchronizing signal has a pulse width greater than that of a horizontal synchronizing signal thereof, and a second latch circuit for latching the second pulse signal by trailing edges of the composite synchronizing signal and for producing an output pulse signal thereof as a vertical synchronizing signal separated from the composite synchronizing signal. The first latch circuit produces the second pulse signal which does not respond to a horizontal synchronizing signal nor an equalizing pulse of the composite synchronizing signal, so that generation of a jitter by the clock pulses is prevented.

12 Claims, 6 Drawing Figures

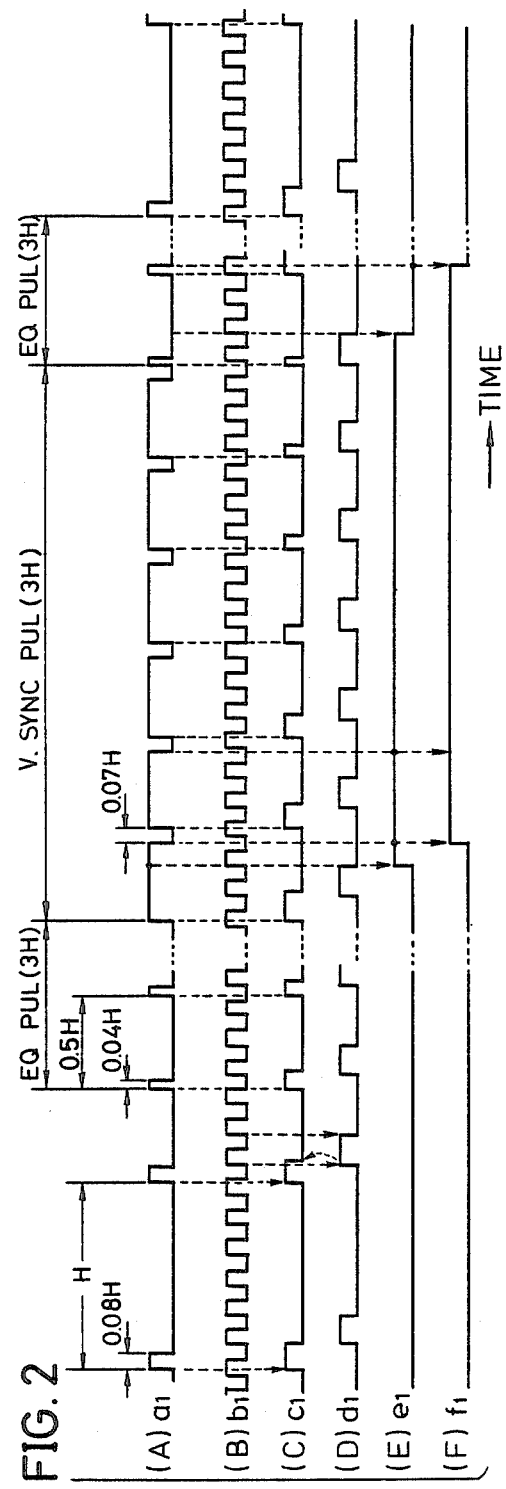

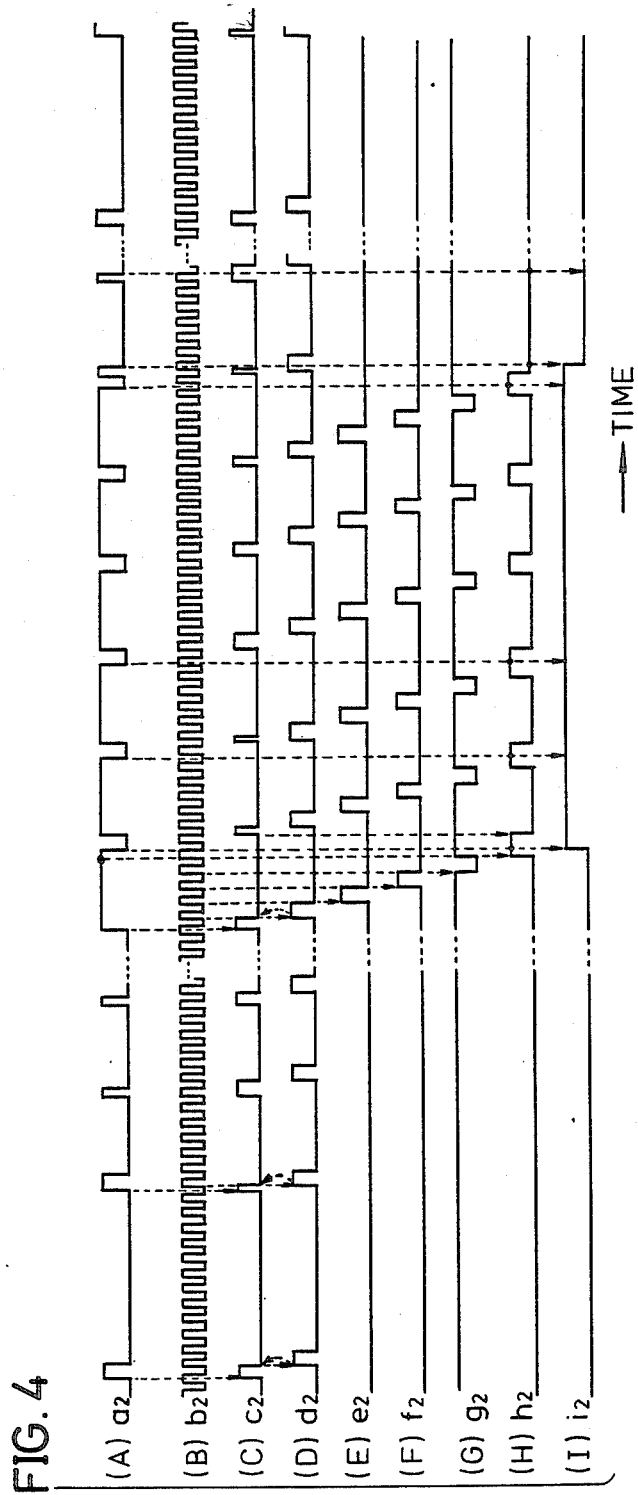

VERTICAL SYNCHRONIZING SIGNAL SEPARATING CIRCUIT

BACKGROUND OF THE INVENTION

The present invention generally relates to vertical synchronizing signal separating circuits, and more particularly to a vertical synchronizing signal separating circuit for separating a vertical synchronizing signal from a composite synchronizing signal by use of digital circuits.

As circuits for separating a vertical synchronizing signal from a composite synchronizing signal, there conventionally are circuits employing an analog system and circuits employing a digital system. The conventional vertical synchronizing signal separating circuit employing the analog system comprises a lowpass filter for filtering a vertical synchronizing signal frequency of the composite synchronizing signal and a pulse amplifier for shaping and amplifying an output signal of the lowpass filter so as to produce the vertical synchronizing signal. On the other hand, the conventional vertical synchronizing signal employing the digital system comprises an up-down counter. For example, the up-down counter counts up when the composite synchronizing signal has a high level and counts down when the composite synchronizing signal has a low level, and the vertical synchronizing signal is separated from the composite synchronizing signal by use of a counted value in the up-down counter.

However, in the case of the conventional vertical synchronizing signal separating circuit employing the analog system, there is a need to provide a capacitor because the lowpass filter is used. As a result, because of the need to provide the capacitor, it is difficult to produce the entire circuit in the form of an integrated circuit. In addition, there is a problem in that a time required for the detection of the vertical synchronizing signal changes depending on a voltage level of the composite synchronizing signal.

On the other hand, in the case of the conventional vertical synchronizing signal separating circuit employing the digital system, the up-down counter is generally constituted by a large number of circuit elements and is designed to count clock pulses. However, since the composite synchronizing signal and the clock pulses are not in synchronism with each other, there is a problem in that a jitter is generated by the clock pulses which are counted in the up-down counter.

SUMMARY OF THE INVENTION

Accordingly, it is a general object of the present invention to provide a novel and useful vertical synchronizing signal separating circuit in which the problems described heretofore are eliminated.

Another and more specific object of the present invention is to provide a vertical synchronizing signal separating circuit comprising a series circuit including a pair of flip-flops coupled in series for generating a first pulse signal which is in phase synchronism with leading edges of a composite synchronizing signal and has a pulse width corresponding to one period of clock pulses supplied thereto, a first latch circuit for latching the composite synchronizing signal by trailing edges of the first pulse signal or a pulse signal which is obtained by successively shifting the first pulse signal so as to produce a second pulse signal having a predetermined level when the composite synchronizing signal has a pulse width greater than that of a horizontal synchronizing signal thereof, and a second latch circuit for latching the second pulse signal by trailing edges of the composite synchronizing signal and for producing an output pulse signal thereof as a vertical synchronizing signal separated from the composite synchronizing signal. According to the vertical synchronizing signal separating circuit of the present invention, the first latch circuit produces the second pulse signal which does not respond to a horizontal synchronizing signal nor an equalizing pulse of the composite synchronizing signal and has the predetermined level when the composite synchronizing signal has the pulse width greater than that of the horizontal synchronizing signal. Hence, it is possible to obtain the vertical synchronizing signal by latching the second pulse signal in the first latch circuit by the trailing edges of the composite synchronizing signal, and no jitter will be generated by the clock pulses even when the clock pulses and the composite synchronizing signal are not in synchronism with each other. In addition, it is possible to separate the vertical synchronizing signal from the composite synchronizing signal by use of a simple digital circuit constituted solely by flip-flops, an inverter and the like. Hence, the vertical synchronizing signal separating circuit is suited for production in the form of an integrated circuit.

Other objects and further features of the present invention will be apparent from the following detailed description when read in conjunction with the accompanying drawings.

BRIEF DESCRIPTION OF THE DRAWINGS

FIG. 1 is a circuit diagram showing a first embodiment of the vertical synchronizing signal separating circuit according to the present invention;

FIGS. 2,(A) through (F) show signal waveforms for explaining the operation of the circuit shown in FIG. 1;

FIGS. 4,(A) through (I) show signal waveforms for explaining the operation of the circuit shown in FIG. 3;

DETAILED DESCRIPTION

Figure 3:
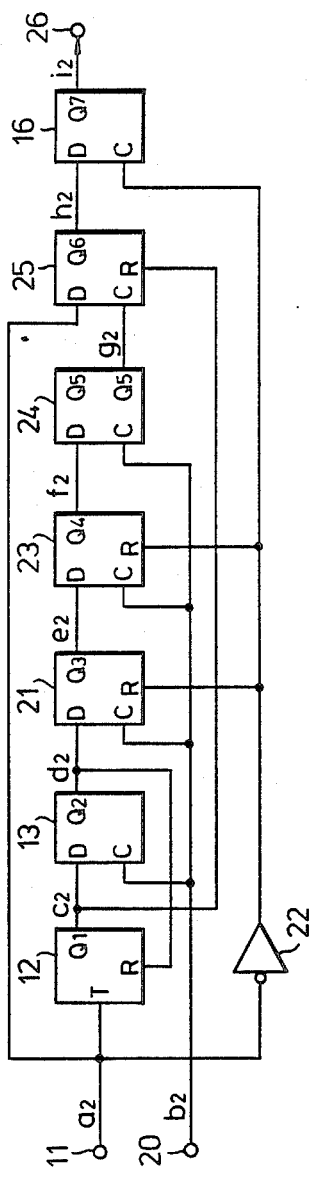
FIG. 3 is a circuit diagram showing a second embodiment of the vertical synchronizing signal separating circuit according to the present invention.

FIG. 1 shows a first embodiment of the vertical synchronizing signal separating circuit according to the present invention. In FIG. 1, a composite synchronizing signal applied to an input terminal 11 is applied to a trigger terminal T of a trigger flip-flop 12. A pulse signal is phase synchronism with rising (leading) edges of the composite synchronizing signal is produced from an output terminal Q1 of the flip-flop 12 and is applied to a data input terminal D of a delay flip-flop 13. Clock pulses b1 shown in FIG. 2(B) having a repetition frequency fsc/32, for example, is applied to an input terminal 14 and is applied to a clock input terminal C of the flip-flop 13, where fsc denotes a chrominance subcarrier frequency of 3.579545 MHz. The input data supplied to the data input terminal D of the flip-flop 13 are latched by rising edges of the clock pulses b1 and are produced from an output terminal Q2 of the flip-flop 13. The latched data from the output terminal Q2 of the flip-flop 13 are applied to a reset terminal R of the flip-flop 12 so as to reset the flip-flop 12 by rising edges of the latched data. Accordingly, in the case where a composite synchronizing signal a1 shown in FIG. 2(A) is applied to the input terminal 11, a pulse signal c1 shown in FIG. 2(C) is produced from the output terminal Q1 of the flip-flop 12 and a pulse signal d1 shown in FIG. 2(D) is produced from the output terminal Q2 of the flip-flop 13. As may be seen from FIGS. 2(B) and 2(D), the pulse signal d1 is in phase synchronism with the clock pulses b1 and has a pulse width corresponding to one period of the clock pulses b1.

A pulse signal $\overline{d1}$ having the inverted polarity of the pulse signal d1 shown in FIG. 2(D) is produced from an output terminal $\overline{Q2}$ of the flip-flop 13 and is applied to a clock terminal C of a delay flip-flop 15 which constitutes a first latch circuit. The flip-flop 15 is also applied with the composite synchronizing signal a1 to a data input terminal D thereof and latches the composite synchronizing signal a1 by rising edges of the pulse signal $\overline{d1}$. As a result, a pulse signal e1 shown in FIG. 2(E) is produced from an output terminal Q3 of the flip-flop 15. As shown in FIG. 2(E), the pulse signal e1 does not respond to a horizontal synchronizing signal having a pulse width of 0.08 H nor an equalizing pulse having a pulse width of 0.04 H, and has a high level only when the composite synchronizing signal a1 still has a high level after a time of 0.14 H to 0.28 H from a rising edge of the composite synchronizing signal a1, where H denotes one horizontal scanning period. There are six low level time periods of 0.07 H each with a period of 0.5 H within a time period of 3 H corresponding to the vertical synchronizing period, that is, the vertical synchronizing pulse of the composite synchronizing signal a1. However, there is no falling (trailing) edge of the pulse signal $\overline{d1}$ shown in FIG. 2(D) (that is, no rising edge of the pulse signal d1) in the low level time periods within the time period of 3 H corresponding to the vertical synchronizing pulse of the composite synchronizing signal a1, and thus, the level of the output pulse signal e1 produced from the output terminal Q3 of the flip-flop 15 becomes low after the vertical synchronizing pulse ends as shown in FIG. 2(E).

A delay flip-flop 16 constitutes a second latch circuit together with an inverter 17. The composite synchronizing signal a1 from the input terminal 11 is inverted in the inverter 17 and an inverted composite synchronizing signal $\overline{a1}$ is applied to a clock input terminal C of the flip-flop 16. Hence, the pulse signal e1 applied to a data input terminal D of the flip-flop 16 is latched by rising edges of the inverted composite synchronizing signal $\overline{a1}$ (that is, falling edges of the composite synchronizing signal $\overline{a1}$). As a result, a pulse signal f1 shown in FIG. 2(F) is produced from an output terminal Q4 of the flip-flop 16 and is supplied to an output terminal 18. The pulse signal f1 is outputted through the output terminal 18 as a separated vertical synchronizing signal. The separated vertical synchronizing signal is in synchronism with the horizontal synchronizing signal of the composite synchronizing signal.

Next, description will be given with respect to a second embodiment of the vertical synchronizing signal separating circuit according to the present invention. The first embodiment described before is advantageous in that the circuit construction of the vertical synchronizing signal separating circuit is simple. However, in the case where a dubbing is performed on a helical scan type video tape recorder (VTR) and signals reproduced from a magnetic tape by use of rotary heads of the VTR are switched over so as to obtain a continuous reproduced signal but a timing of the signal switchover (that is, the switching of the rotary heads) goes wrong due to causes such as a stretch in the magnetic tape, for example, a pulse interval of the composite synchronizing signal in a vicinity of the signal switchover does not become exactly equal to 1 H and the circuit of the first embodiment may perform an erroneous operation. The second embodiment is designed to eliminate this problem of the first embodiment.

FIG. 3 shows the third embodiment of the vertical synchronizing signal separating circuit according to the present invention, and in FIG. 3, those parts which are the same as those corresponding parts in FIG. 1 are designated by the same reference numerals, and description thereof will be omitted. In FIG. 3, clock pulses b2 shown in FIG. 4(B) having a repetition frequency fsc/16 which is twice the repetition frequency of the clock pulses b1 of the first embodiment are applied to an input terminal 20. The clock pulses b2 are applied to clock terminals C of the flip-flop 13 and delay flip-flops 21, 23 and 24. When a composite synchronizng signal a1 shown in FIG. 4(A) is applied to the input terminal 11, a pulse signal c2 shown in FIG. 4(C) is produced from the output terminal Q1 of the flip-flop 12 and a pulse signal d2 shown in FIG. 4(D) is produced from the output terminal Q2 of the flip-flop 13. The flip-flops 21, 23 and 24 are coupled in series so that an output terminal of one flip-flop is coupled to a data input terminal of another flip-flop in a subsequent stage, and the clock pulses b2 from the input terminal 20 are commonly applied to clock input terminals C of the flip-flops 21, 23 and 24. Hence, the pulse signal d2 from the output terminal Q2 of the flip-flop 13 is successively shifted by the flip-flops 21, 23 and 24, and pulse signals e2, f2 and g2 shown in FIGS. 4(E), 4(F), and 4(G) are produced from output terminals Q3, Q4 and Q5 of the respective flip-flops 21, 23 and 24. The pulse signal g2 is applied to a clock input terminal C of a delay flip-flop 25. The flip-flops 21 and 23 are forcibly reset during a time period in which the composite synchronizing signal a1 has a low level.

The pulse signal c2 is applied to a reset terminal R of the flip-flop 25. Hence, the flip-flop 25 is reset during a time period in which the pulse signal c2 has a high level, and produces a pulse signal h2 shown in FIG. 4(H) from an output terminal Q6 thereof by latching the composite synchronizing signal a2 by rising edges of the pulse signal g2. The flip-flop 16 latches the pulse signal h2 by falling edges of the composite synchronizing signal a2, and produces a pulse signal i2 shown in FIG. 4(I) from the output terminal Q7 thereof. The pulse signal i2 is outputted through an output terminal 26 as the separated vertical synchronizing signal. The separated vertical synchronizing signal is in synchronism with the horizontal synchronizing signal of the composite synchronizing signal.

According to the present embodiment, an inverted composite synchronizing signal $\overline{a2}$ from an inverter 22 is applied to reset terminals R of the flip-flops 21 and 23 and the flip-flops 21 and 23 are forcibly reset during the time period in which the composite synchronizing signal a2 has the low level even when the pulse interval of the composite synchronizing signal a2 in the vicinity of the signal switchover is not exactly equal to 1 H. Furthermore, the flip-flop 25 is reset during the time period in which the pulse signal c2 has the high level. For this reason, a vertical synchronizing signal will not be outputted erroneously when the pulse interval of the composite synchronizing signal a2 in the vicinity of the signal switchover is not exactly equal to 1 H. For example, in the case where the composite synchronizing signal is not the regular signal shown in FIG. 4(A) and there are no pulses having the pulse width of 0.07 H in the vertical synchronizing pulse, the vertical synchronizing signal is not obtained until after the time period of 3 H corresponding to the vertical synchronizing pulse which includes no pulses having the pulse width of 0.07 H.

Figure 5:
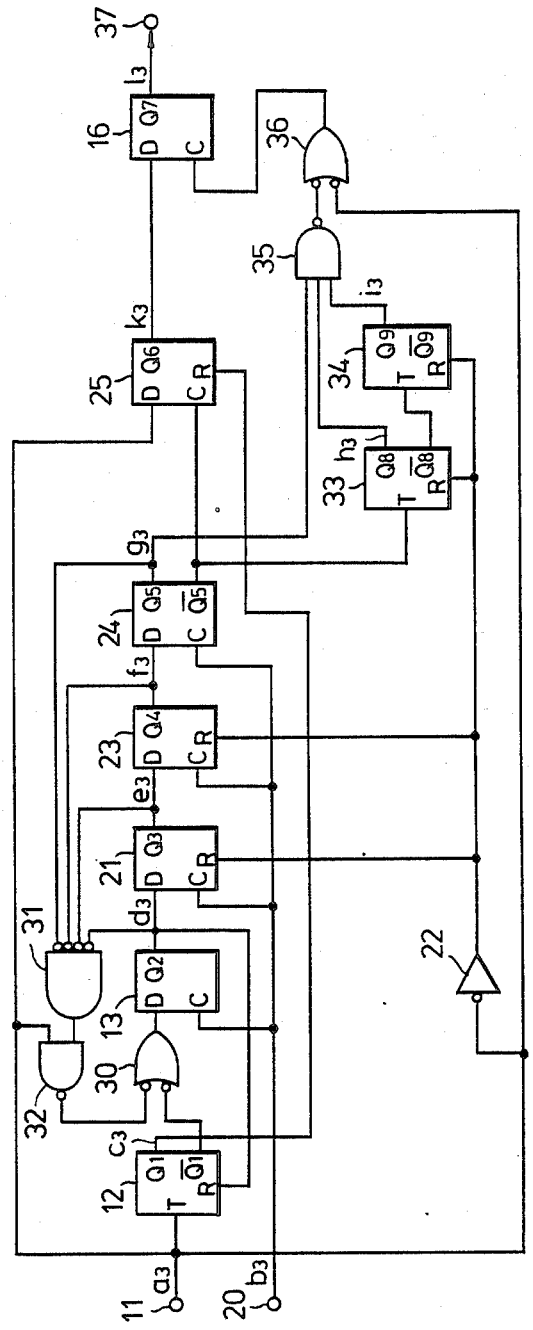
FIG. 5 is a circuit diagram showing a third embodiment of the vertical synchronizing signal separating circuit according to the present invention.
Figure 6:
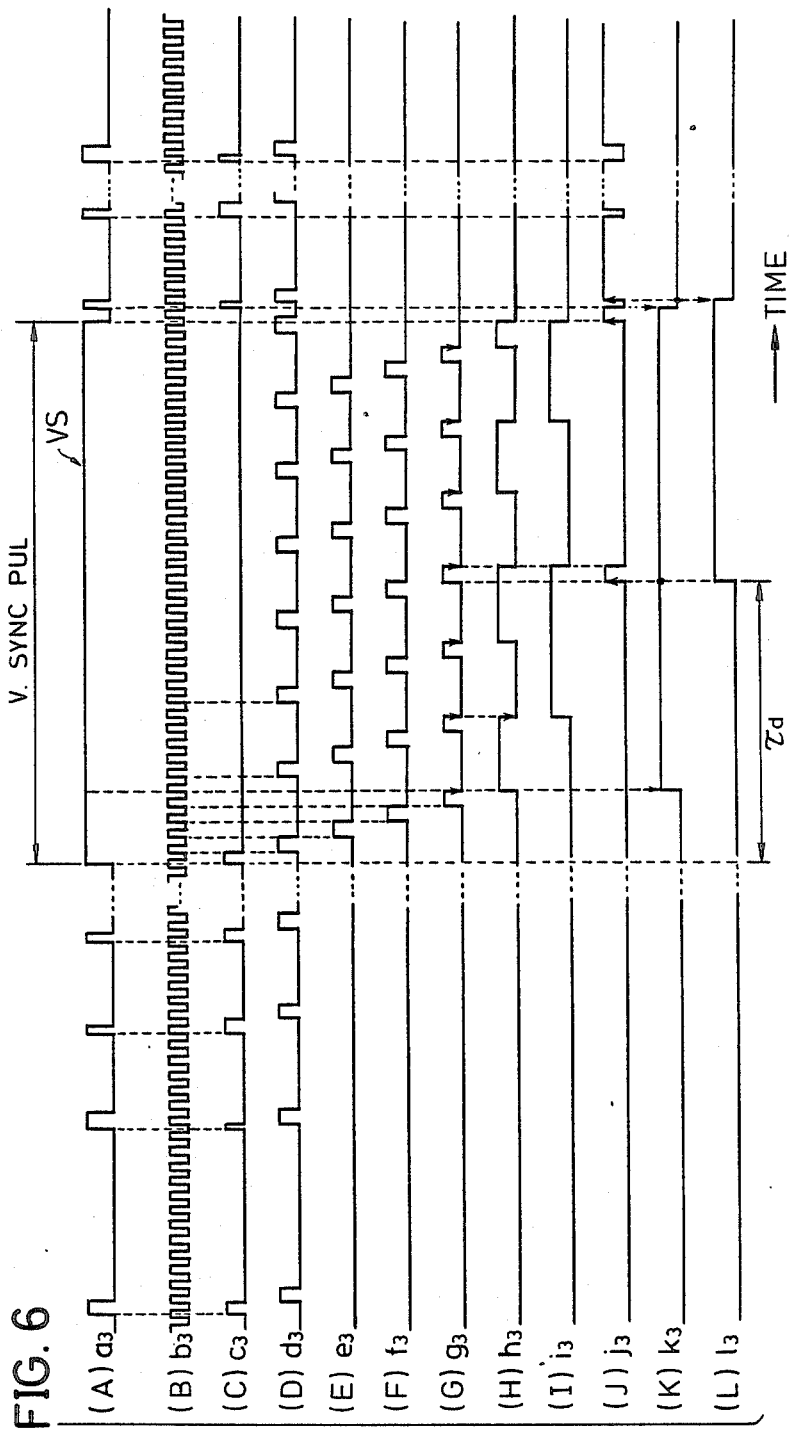
FIGS. 6,(A) through (L) show signal waveforms for explaining the operation of the circuit shown in FIG. 5.

FIG. 5 shows a third embodiment of the vertical synchronizing signal separating circuit according to the present invention. The third embodiment is designed so as to separate the vertical synchronizing signal from a composite synchronizing signal a3 shown in FIG. 6(A) comprising a vertical synchronizing pulse VS which includes no pulses having the pulse width of 0.07 H. The present embodiment uses the clock pulses to separate the vertical synchronizing signal at a portion of the composite synchronizing signal where the horizontal synchronizing signal does not exist. In FIG. 5, those parts which are the same as those corresponding parts in FIG. 3 are designated by the same reference numerals, and description thereof will be omitted. The output pulse signals of the flip-flops 13, 21, 23 and 24 are passed through a 4-input NOR circuit 31. A 2-input NAND circuit 32 is supplied with a composite synchronizing signal from the input terminal 11 and an output signal of the NOR circuit 31. A pulse signal from an output terminal Q1 of the flip-flop 12 and an output signal of the NAND circuit 32 are supplied to a 2-input NAND circuit 30, and an output signal of the NAND circuit 30 is applied to a data input terminal D of the flip-flop 13. In the case where the composite synchronizing signal a3 shown in FIG. 6(A) is applied to the input terminal 11, pulse signals c3, d3, e3, f3 and g3 shown in FIGS. 6(C), 6(D), 6(E), 6(F) and 6(G) are produced from the respective flip-flops 12, 13, 21, 23 and 24. FIG. 6(B) shows clock pulses b3 which are applied to the input terminal 20.

A pulse signal g3 from the output terminal Q5 of the flip-flop 24 is applied to the clock input terminal C of the flip-flop 25 and to a trigger input terminal T of a trigger flip-flop 33. The flip-flop 33 is triggered by rising edges of the pulse signal g3. A pulse signal h3 produced from an output terminal Q8 of the flip-flop 33 is applied to a trigger input terminal T of a trigger flip-flop 34 and triggers the flip-flop 34 by rising edges of the pulse signal h3. An inverted composite synchronizing signal $\overline{a3}$ from the inverter 22 is applied to reset terminals R of the flip-flops 33 and 34. Since the flip-flops 33 and 34 are forcibly reset during a time period in which the inverted composite synchronizing signal $\overline{a3}$ has a high level, the pulse signal h3 shown in FIG. 6(H) is produced from the output terminal Q8 of the flip-flop 33 and a pulse signal i3 shown in FIG. 6(I) is produced from an output terminal Q9 of the flip-flop 34. The flip-flops 33 and 34 respectively produce a pulse signal which is inverted for every rising edge of the input pulse applied to the trigger input terminal T thereof and is reset by a falling edge of the vertical synchronizing pulse VS within the composite synchronizing signal a3. A 3-input NAND circuit 35 is supplied with a pulse signals g3, h3 and i3, and an output signal of the NAND circuit 35 is supplied to a 2-input NAND circuit 36 which is supplied with the composite synchronizing signal a3 from the input terminal 11. An output pulse signal j3 of the NAND circuit 36 shown in FIG. 6(J) is applied to the clock input terminal C of the flip-flop 16.

The flip-flop 16 latches a pulse signal k3 produced from the output terminal Q6 of the flip-flop 25 by rising edges of the pulse signal j3, and produces a pulse signal l3 shown in FIG. 6(L) from the output terminal Q7 thereof. As shown in FIG. 6(L), the pulse signal l3 rises to a high level after a predetermined time $\tau d$ from a time when the vertical synchronizing pulse VS is received and falls at a rise in an equalizing pulse immediately after the vertical synchronizing pulse VS. The predetermined time $\tau d$ is selected to a time which is eighteen to nineteen times one period $T_{CLK}$ of the clock pulses b3, for example. The pulse signal l3 is outputted through an output terminal 37 as the separated vertical synchronizing signal.

In the case where the composite synchronizing signal applied to the input terminal 11 in FIG. 5 comprises a vertical synchronizing pulse including pulses having the pulse width of 0.07 H within the vertical synchronizing period as in the case of the composite synchronizing signals a1 and a2 shown in FIGS. 2(A) and 4(A), the NAND circuits 30 and 36 operate as inverters. In this case, the circuit shown in FIG. 5 operates similarly to the circuit shown in FIG. 3.

According to the first through third embodiments described heretofore, it is possible to separate from a composite synchronizing signal which comprises a vertical synchronizing pulse including pulses having a pulse width of 0.07 H within the vertical synchronizing period a vertical synchronizing signal by use of a digital circuit constituted solely by flip-flops, an inverter and the like. Hence, the vertical synchronizing signal separating circuit is suited for production in the form of an integrated circuit. A pulse signal is produced based on clock pulses and the composite synchronizing signal and the vertical synchronizing signal is obtained by latching this pulse signal by falling edges of the composite synchronizing signal. Hence, no jitter will be generated by the clock pulses even when the clock pulses and the composite synchronizing signal are not in synchronism with each other. In addition, by adding logic circuits as in the case of the third embodiment, it is possible to separate the vertical synchronizing signal from a composite synchronizing signal which comprises a vertical synchronizing pulse including no pulses having the pulse width of 0.07 H within the vertical synchronizing period.

Further, the present invention is not limited to these embodiments, but various variations and modifications may be made without departing from the scope of the present invention.

What is claimed is:

1. A vertical synchronizing signal separating circuit comprising:
    a first input terminal supplied with a composite synchronizing signal;
    a second input terminal supplied with clock pulses having a predetermined repetition frequency;
    a series circuit comprising a pair of flip-flops coupled in series and supplied with the composite synchronizing signal and the clock pulses for generating a first pulse signal in phase synchronism with leading edges of the composite synchronizing signal, said first pulse signal having a pulse width corresponding to one period of the clock pulses;

a first latch circuit supplied with the composite synchronizing signal and the first pulse signal for latching the composite synchronizing signal by trailing edges of the first pulse signal so as to produce a second pulse signal having a predetermined level when the composite synchronizing signal has a pulse width greater than that of a horizontal synchronizing signal thereof; and a second latch circuit supplied with the composite synchronizing signal and the second pulse signal for latching the second pulse signal by trailing edges of the composite synchronizing signal and for producing an output pulse signal thereof as a vertical synchronizing signal separated from the composite synchronizing signal.

2. A vertical synchronizing signal separating circuit as claimed in claim 1 in which said series circuit comprises a first flip-flop supplied with the composite synchronizing signal to a trigger input terminal thereof and a second flip-flop supplied with an output signal of said first flip-flop to a data input terminal thereof and with the clock pulses to a clock input terminal thereof, said second flip-flop supplying a first output signal thereof to a reset terminal of said first flip-flop, said second flip-flop producing a second output signal thereof as said first pulse signal.

3. A vertical synchronizing signal separating circuit as claimed in claim 2 in which said first latch circuit comprises a third flip-flop supplied with the second output signal of said second flip-flop to a clock input terminal thereof and with the composite synchronizing signal to a data input terminal thereof, said third flip-flop producing an output signal thereof as said second pulse signal.

4. A vertical synchronizing signal separating circuit as claimed in claim 1 in which said second latch circuit comprises an inverter for inverting the composite synchronizing signal and a flip-flop supplied with the second pulse signal to a data input terminal thereof and with an output signal of said inverter to a clock input terminal thereof, said flip-flop producing an output signal thereof as the separated vertical synchronizing signal.

5. A vertical synchronizing signal separating circuit comprising:
a first input terminal supplied with a composite synchronizing signal;
a second input terminal supplied with clock pulses having a predetermined repetition frequency;
a series circuit comprising a pair of flip-flops coupled in series and supplied with the composite synchronizing signal and the clock pulses for generating a first pulse signal in phase synchronism with leading edges of the composite synchronizing signal, said first pulse signal having a pulse width corresponding to one period of the clock pulses;
a shifting circuit supplied with the first pulse signal and the clock pulses for successively shifting the first pulse signal by a predetermined number of shifting stages responsive to the clock pulses and for producing a second pulse signal;
a first latch circuit supplied with the composite synchronizing signal and the second pulse signal for latching the composite synchronizing signal by trailing edges of the second pulse signal so as to produce a third pulse signal having a predetermined level when the composite synchronizing signal has a pulse width greater than that of a horizontal synchronizing signal thereof; and a second latch circuit supplied with the composite synchronizing signal and the third pulse signal for latching the third pulse signal by trailing edges of the composite synchronizing signal and for producing an output pulse signal thereof as a vertical synchronizing signal separated from the composite synchronizing signal.

6. A vertical synchronizing signal separating circuit as claimed in claim 5 in which said series circuit comprises a first flip-flop supplied with the composite synchronizing signal to a trigger input terminal thereof and a second flip-flop supplied with an output signal of said first flip-flop to a data input terminal thereof and with the clock pulses to a clock input terminal thereof, said second flip-flop supplying a first output signal thereof to a reset terminal of said first flip-flop, said second flip-flop producing a second output signal thereof as said first pulse signal.

7. A vertical synchronizing signal separating circuit as claimed in claim 6 in which said shifting circuit comprises a plurality of stages of flip-flops coupled in series, said first pulse signal being supplied to a data input terminal of one of said plurality of flip-flops provided in a first stage, one of said plurality of flip-flops provided in a final stage producing an output signal thereof as said second pulse signal.

8. A vertical synchronizing signal separating circuit as claimed in claim 7 in which said first latch circuit comprises a third flip-flop supplied with the output signal of said flip-flop provided in the final stage to a clock input terminal thereof and with the composite synchronizing signal to a data input terminal thereof, said third flip-flop producing an output signal thereof as said third pulse signal and being reset by the output signal of said first flip-flop.

9. A vertical synchronizing signal separating circuit as claimed in claim 5 in which said second latch circuit comprises an inverter for inverting the composite synchronizing signal and a flip-flop supplied with the third pulse signal to a data input terminal thereof and with an output signal of said inverter to a clock input terminal thereof, said flip-flop producing an output signal thereof as the separated vertical synchronizing signal.

10. A vertical synchronizing signal separating circuit as claimed in claim 9 in which said shifting circuit comprises a plurality of stages of flip-flops coupled in series, said inverter supplying the output signal thereof to one of the flip-flops constituting said shifting circuit.

11. A vertical synchronizing signal separating circuit as claimed in claim 5 in which said second latch circuit comprises a circuit part supplied with the composite synchronizing signal and the second pulse signal for producing a fourth pulse signal in phase with the second pulse signal, and a first flip-flop supplied with the third and fourth pulse signals for latching the third pulse signal by the fourth pulse signal so as to produce a fifth pulse signal which rises after a specific time from a leading edge of a vertical synchronizing pulse of the composite synchronizing signal and falls at a leading edge of an equalizing pulse of the composite synchronizing signal immediately after the vertical synchronizing pulse, said first flip-flop producing the fifth pulse signal as the separated vertical synchronizing signal.

12. A vertical synchronizing signal separating circuit as claimed in claim 11 in which said specific time is eighteen to nineteen times one period of the clock pulses.

* * * * *